UNITED STATES PATENT OFFICE 1,980,366

SOLIDIFICATION OF ORGANIC ISOCOLLOIDS CONTAINING UNSATURATED HIGH MOLECULAR ACIDS

László Auer, Budapest, Hungary, assignor to J. Randolph Newman, Washington, D. C., as trustee No Drawing. Application April 30, 1929, Serial No. 359,426. In Great Britain May 8, 1928

16 Claims. (Cl. 106—23)

This invention relates to the manufacture of solidified oil products from fatty oils, and it comprises methods of making such products wherein the fatty oil is mixed with certain metal peroxides and the mixture is heated to 200° C. or above, until said solidified oil products are obtained, the heating being advantageously effected under reduced pressures or vacuum; and it comprises the new and valuable solidified oil products thus obtained; all as more fully hereinafter set forth and as claimed.

In the varnish industry, barium peroxide has been used in small percentages in the process of hardening of common resin by lime in order to oxidize impurities and produce a lighter coloured product. It is further known to produce quick-drying boiled linseed oils with the aid of manganese peroxide and to obtain manganese siccatives (dryers) with the aid of the same material. In all the above cases it was the aim, however, to produce either a comparatively insignificant change in the viscosity and other properties, or to obtain quicker-drying boiled oils, or to produce solid siccatives able to bring about a similar property in the boiled oils by use in their manufacture.

The present invention, on the other hand, has for its aim to produce quite new products with entirely new properties, which may themselves be used as new binding materials in varnishes, linoleums and other articles for the manufacture of which plastic materials are required.

It is found that when suitable amounts of certain metal peroxides are dissolved or dispersed in fatty oils under the action of heat, these oils become considerably harder and their melting point is raised.

According to this invention, therefore, a process is provided for solidifying or hardening fatty oils, characterized by subjecting the fatty oil to be hardened to the action of metallic peroxides at elevated temperatures until dispersion, e. g. dissolution and hardening takes place.

According to my new processes, fatty oils are mixed with metallic peroxides and the mixture heated until said peroxide is dispersed or dissolved in the fatty oil and a substantially modified oil product is obtained. The temperature should be sufficient to effect this dispersion or dissolution of the metallic peroxide in the fatty oil and to effect a certain interaction between the fatty oil and the metallic peroxide producing the said modification. The temperature may be advantageously between 200 and 300° C. In a latter part of this specification I set forth the metallic peroxides which I have found to be advantageous and produce excellent results. The pressure under which the mixture is heated has an effect upon the results obtained and the results may be altered by the particular pressure used. I have found that heating under vacuum is advantageous. There are many modifications within my generic invention all of which are advantageous in particular instances. One of the features of my invention is that by selecting a particular metallic peroxide with respect to the starting material and controlling and varying the other conditions, I may obtain at will a product having desired characteristics. It is possible to obtain products which are substantially the same from different starting materials by properly selecting the specific materials and conditions. The specific examples and the detailed disclosure given clearly disclose the various modifications and their effect and those demonstrate the possibilities of my new generic process.

In certain cases, in addition to metallic peroxides, electrolytes such as disclosed in my co-pending application Ser. No. 143,786, may be used as modifying agents.

The hardening is effected at temperatures lying approximately at or between the limits of 200° and 300° C. and is most usually carried out between 250° and 300° C., and it may be advantageously effected under sub-atmospheric pressure, but in exceptional cases pressure greater than atmospheric may be used.

The treated product may subsequently be subjected to vulcanization with sulphur or a sulphur compound, with or without an accelerator e. g. tetramethylthiuram disulphide, mercaptobenzthiazole etc.

The best results are obtainable when from 2 to 10% of the reagent is added to the starting material.

Of the various peroxides the best results are yielded by magnesium peroxide and zinc peroxide, but good results are also obtained with barium-, strontium-, calcium-, and sodium-peroxides. For some special purposes also cerium-, nickel-, and bismuth-peroxides are useful among others.

The invention may be practically applied to the hardening of drying oils (for example, linseed oil), and the hardening of semi-drying or non-drying glycerides of fatty acids (for example castor oil).

The fatty oils solidified by the above method yield new raw materials for varnishes characterized by a quicker drying property in comparison with the untreated oils. Further, they may be used as a binding material in the linoleum industry instead of linoxin, and quite generally they are useful for all such purposes for which plastic materials are used, such, for instance, as shellac substitute (in gramophone records etc.) wax substitute and the like.

By the terms "hardening" and "solidification", I intend to indicate not only that hard or solid materials are produced from liquids, but also that a partial hardness or increase in solidity, characterized by a higher melting point, may result.

I have found that products obtained under application of vacuum are clearer and in most cases harder than those produced at normal atmospheric pressures. It is also possible, however, to obtain good results at normal atmospheric pressure and also at increased pressures.

I have further observed that it is sometimes of advantage to subject the reaction mass to a gas treatment, for instance by blowing nitrogen, sulphur dioxide, hydrogen sulphide, carbon dioxide, or other modifying gases through it. The gas treatment promotes solidification, and the introduced gases intensify the action of the oxygen generated by the peroxides in the reaction mass. Alternating treatment with sulphur dioxide and sulphuretted hydrogen is specially advantageous, and the vulcanizing treatment which results from the formation of sulphur in situ by such alternating gas treatment may be advantageously influenced by the use of accelerators, e. g. benzoquinone.

The products of my invention can be vulcanized and they can also further be used in the form of emulsions. For the purposes of vulcanization, the use of vulcanization accelerators (e. g. tetramethylenthiuram disulphide, mercaptobenzthiazole etc.), with or without an activator (e. g. zinc oxide), is advantageous. I have further found that improved products are obtained in certain cases by exposing the reaction mixture to oscillating energy (for example X-rays, ultra-violet rays and the like), or by addition of organic metal-free compounds (e. g. formaldehyde, phenol, thiocarbanilide, benzidine, hexamethylenetetramine, 2:3 hydroxynaphthoic acid, a-naphthol, quinoline, pyrogallol, benzene glycerol and phthalimide) as secondary reagents.

My invention is illustrated but not limited by the following examples, in which the parts are by weight.

Example 1.—300 parts of linseed oil are heated with 15 parts of magnesium peroxide under a vacuum of 28 inches mercury to 250–300° C. for 5 hours. The product is poured into moulds and on cooling gives a hard solid suitable for use in the manufacture of varnishes, linoleum, etc.

Example 2.—300 parts of linseed oil are heated with 15 parts of zinc peroxide exactly as described in Example 1. The product is a soft brown solid which may be used in the varnish industry, and in the form of an emulsion for various purposes.

Example 3.—300 parts of linseed oil are heated with 7 parts of cerium peroxide in an enamelled open vessel to 250–300° C. for 5 hours. The product may be poured into moulds and on cooling forms a soft, plastic solid.

Example 4.—500 parts of linseed oil are modified by treatment with 50 parts of magnesium peroxide under vacuum at 250–300° C. for 15 minutes. The cooled product forms a hard, brittle solid.

Example 5.—300 parts of castor oil are treated with 6 parts of sodium peroxide under vacuum at temperatures above 200° C. for 2–3 hours. 60 parts of this solidified oil on treatment with 6 parts of sulphur and 1.2 parts of zinc oxide at 140° C. give a vulcanized product which can be used as a rubber substitute.

What I claim is:

1. As an improvement in the manufacture of solidified oil products from fatty oils, said oil products being of improved quality and properties, having in part the properties of a heat-bodied, polymerized oil and in part the properties of an oxidized oil and being composite materials useful in making varnishes, linoleum and other commercial products, the improved process which comprises mixing about 100 parts of a fatty oil with between 2 to 10 parts of a metallic peroxide, the said peroxide being selected from a peroxide of a metal of the class consisting of magnesium, zinc, barium, strontium, calcium, sodium, cerium, nickel and bismuth, heating the mixture to temperatures sufficient to heat-body and polymerize said fatty oil, until said peroxide is dispersed in said fatty oil and continuing the heating until solidified oil product is obtained, said temperatures being between 200 and 300° C.; the temperature, proportions and metallic peroxide selected, being correlated to adjust the properties of the said composite oil product.

2. The process of claim 1 in which the said fatty oil is a drying fatty oil.

3. The process of claim 1 in which the said metallic peroxide selected, is an alkaline earth metal peroxide.

4. The process of claim 1 in which the said metallic peroxide is magnesium peroxide.

5. The process of claim 1 in which the said heating is effected under a substantial vacuum.

6. As an improvement in the manufacture of improved oil products from linseed oil and like drying oils, said improved products being thickened, bodied, composite oil products having in part the properties of an oxidized oil, the improved process which comprises mixing about 100 parts of a drying fatty oil with about 2 to 10 parts of an alkaline earth metal peroxide, heating the mixture to between 250 and 300° C. under a substantial vacuum, until the said peroxide is dispersed in said fatty oil and said composite oil product is obtained.

7. The process of claim 6 in which the said drying fatty oil is linseed oil.

8. The process of claim 6 in which the said substantially vacuum is equivalent to about 28 inches of mercury.

9. The process of claim 6 in which the said alkaline earth metal peroxide is magnesium peroxide.

10. In the manufacture of improved solidified oil products from fatty oils the process which comprises mixing about 100 parts of said fatty oil with about 2 to 10 parts of a metallic peroxide, heating the mixture to between 250 and 300° C. under vacuum equivalent to approximately 28 inches of mercury, until said peroxide is dispersed in said fatty oil and a substantially modified product is obtained.

11. In the manufacture of improved solidified oil products from linseed oil the process which comprises mixing about 100 parts of linseed oil with about 5 parts of magnesium peroxide, heating the mixture to between 250 and 300° C. under vacuum, until said peroxide is dispersed in said linseed oil and upon cooling a hard solid modified product is obtained.

12. The process of claim 1, wherein said metallic peroxide is zinc peroxide.

13. The process of claim 1, wherein 100 parts of linseed oil is mixed with 5 parts of zinc peroxide and the mixture is heated to between 250° and 300° C. under a vacuum of 28 inches of mercury for 5 hours.

14. The process of claim 1 wherein said fatty oil is a drying oil, said metallic peroxide is zinc peroxide and said heating is effected under vacuum.

15. The process of claim 1 wherein said fatty oil is a non-drying oil.

16. The process of claim 1, wherein said fatty oil is castor oil, said metallic peroxide is sodium peroxide and said heating is effected under vacuum.

LÀSZLÓ AUER.